(12) United States Patent
Yokoyama et al.

(10) Patent No.: US 6,573,348 B2
(45) Date of Patent: Jun. 3, 2003

(54) CURABLE RESIN COMPOSITION

(75) Inventors: Katsutoshi Yokoyama, Osaka (JP); Kazuya Tsujimura, Osaka (JP)

(73) Assignee: Daiso Co. LTD, Osaka (JP)

( * ) Notice: Subject to any disclaimer, the term of this patent is extended or adjusted under 35 U.S.C. 154(b) by 78 days.

(21) Appl. No.: 09/829,997

(22) Filed: Apr. 11, 2001

(65) Prior Publication Data

US 2001/0053830 A1 Dec. 20, 2001

(30) Foreign Application Priority Data

Apr. 13, 2000 (JP) ........................................ 2000-112109

(51) Int. Cl.$^7$ ................................................. C08J 28/02
(52) U.S. Cl. .................... 526/286; 526/301; 526/302; 526/304; 526/320; 526/288; 526/293; 526/298; 526/307.3; 526/307.4; 526/307.6; 526/310; 526/318.1; 526/318.2; 526/318.44; 526/321; 526/325; 526/326; 524/261
(58) Field of Search ................... 522/123, 157, 522/158, 161; 524/261; 623/6, 11; 526/286, 301, 302, 304, 320, 288, 293, 298, 307.3, 307.4, 307.6, 310, 318.1, 318.2, 318.44, 321, 325, 326

(56) References Cited

U.S. PATENT DOCUMENTS 5,206,092 A * 4/1993 Araki et al. ................. 428/447
5,449,729 A * 9/1995 Lai ............................ 526/286
6,437,069 B1 * 8/2002 Yokoyama .................. 526/320

FOREIGN PATENT DOCUMENTS

| JP | 63-234032 |   | 9/1988 |
| JP | 1-197528  |   | 8/1989 |
| JP | 2-35645   |   | 8/1990 |
| JP | 2-270859  |   | 11/1990 |
| JP | 4-58489   |   | 9/1992 |
| JP | 4-351612  |   | 12/1992 |
| JP | 06184241  | * | 7/1994 |

* cited by examiner

*Primary Examiner*—Tatyana Zalukaeva
(74) *Attorney, Agent, or Firm*—Wenderoth, Lind & Ponack L.L.P.

(57) ABSTRACT

A curable resin composition containing (A) an aromatic diallyl compound, (B) an acid derivative or an aliphatic group-containing compound having at least 4 (meth)acryl groups in one molecule, (C) divinylbenzene, and (D) a polythiol compound having at least two mercapto groups in one molecule provides an optical material having a desirable refractive index, Abbe number and transparency, and excellent heat resistance.

15 Claims, No Drawings

CURABLE RESIN COMPOSITION

FIELD OF THE INVENTION

The present invention relates to a curable composition providing an optical part such as a plastic lens and a camera lens and a product relevant to optics such as an adhesive and a coating agent, which have excellent optical properties such as the refractive index, the Abbe number and the transparency, and the heat resistance and have various excellent mechanical properties.

RELATED ART

An organic glass has drawn attention as an optical material, especially as a lens material, owing to the lighter weight property as compared with an inorganic glass. The organic glass such as a diethylene glycol bis(allyl carbonate) polymer has been presently used. The organic glass made of diethylene glycol bis(allyl carbonate) is light in weight, excellent in the impact resistance, the size stability, the mechanical processibility, and the hard coating property, and is widely used as a material for lenses of eye glasses in place of the inorganic glass.

However, the organic glass made of polyethylene glycol bis(allyl carbonate) has the refractive index as low as about 1.50. Therefore, in the practical application, the thickness of the lenses should be thick and it results in elimination of the advantage of light in weight and leads to a disadvantage that the appearance is inferior. Especially in case of lenses having high power, such tendency is considerable and the organic glass cannot necessarily be said to be suitable as a lens material for eye glasses.

In order to overcome such disadvantages, there are disclosed many proposals such as a resin obtained by reaction between a sulfur atom-containing polythiol compound and an isocyanate (cf. Japanese Patent Kokoku Publication No. 4-58489 (1992)), and a resin comprising polythiol containing a further larger quantity of sulfur atoms (cf. Japanese Patent Kokai Publication No. 2-270859 (1990)).

However, in case of using the isocyanate, the resultant composition has disadvantages that the composition is inferior in storage stability before curing and is easily affected with moisture in air and there is the problem such as the difficulty of the curing conditions. Another problem is that many of polyisocyanate compounds have high toxicity.

Also proposed is a method for copolymerization curing an unsaturated compound having at least one unsaturated group such as a (meth)acryloyl group and an allyl group, and a polymercapto compound having at least two mercapto groups (cf. Japanese Patent Kokoku Publication No. 2-35645 (1990)). When the bifunctional allyl compound such as diallyl phthalate and the polymercapto compound are used, the polymerization is not sufficiently proceeded, thus giving the insufficient heat resistance.

When a (meth)acrylic compound and a polymercapto compound are used as disclosed in Japanese Patent Kokai Publication No. 63-234032 (1988), the resultant material basically has an aliphatic structure to give the insufficient refractive index.

Furthermore, Japanese Patent Kokai Publication No. 4-351612 (1992) discloses that an aromatic vinyl compound and a (meth)acrylic acid ester having at least two polymerizable functional groups are copolymerized in presence of a thiol compound which is for the purpose of controlling the polymerization. However, the absolute amount of the thiol component is small and the impact resistance of the resultant cured material is insufficient.

Japanese Patent Kokai Publication No. 1-197528 (1989) discloses that a composition for a lens having a high refractive index comprises divinylbenzene and a thiol compound having two or more aliphatic SH groups. However, such composition having binary ingredients is insufficient in the heat resistance and at least one of the refractive index and the Abbe number is inferior. In some cases, the compatibility between divinylbenzene and the thiol compound is not good and a material having excellent transparency cannot be obtained.

No material having satisfactory physical properties such as the refractive index, the Abbe number, the heat resistance and the transparency has been obtained from the binary ingredients of divinylbenzene and the thiol compound.

SUMMARY OF THE INVENTION

One of objects of the present invention is to provide a curable resin composition capable of providing a cured material (e.g. an optical body) having excellent optical properties (e.g. the refractive index, the Abbe number and the transparency) and excellent heat resistance.

Inventors of the present invention have intensively investigated various compositions containing binary ingredients of divinylbenzene and a thiol compound imparting high heat resistance and high transparency while maintaining a high refractive index and a high Abbe number, and then achieved the present invention.

The present invention relates to a curable resin composition comprising:

(A) at least one aromatic diallyl compound;

(B) at least one unsaturated functional-group containing compound selected from the group consisting of an acid derivative obtained by replacing all of hydrogen atoms existing in a compound selected from cyanuric acid, isocyanuric acid and those obtained by substituting all of oxygen atoms existing in cyanuric acid and isocyanuric acid by sulfur atoms, with the organic group of the formula (I):

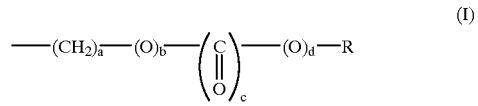

wherein a denotes an integer of from 0 to 2; b denotes 0 or 1; c denotes 0 or 1; d denotes 0 or 1; and R denotes an unsaturated functional group, and an aliphatic group-containing compound having an aliphatic skeleton bonded to at least three unsaturated functional groups;

(C) divinylbenzene; and (D) at least one polythiol compound having at least two mercapto groups in one molecule.

DETAILED EXPLANATION OF THE INVENTION

The aromatic diallyl compound (A) used in the present invention may be a polybasic acid ester of an ally alcohol which has an aromatic ring. Specific examples of the aromatic diallyl compound (A) include diallyl isophthalate, diallyl orthophthalate and diallyl terephthalate. These are used alone or in combination thereof. Diallyl isophthalate is particularly preferable.

The addition amount of the aromatic diallyl compound (A) is preferably from 1 to 10% by weight, more preferably from 1 to 5% by weight based on the total amount of the components (A) to (D).

The component (B) are an acid derivative or an aliphatic group-containing compound. An unsaturated functional group in the component (B) is a group having a carbon—carbon double bond. Examples of the unsaturated functional group include a vinyl group ($CH_2=CH—$), an allyl group, a methallyl group, an acryloyl group and a methacryloyl group.

In the acid derivative among the component (B), the unsaturated functional group R is preferably selected from the group consisting of an allyl group, a methallyl group, an acryloyl group and a methacryloyl group. Three unsaturated functional groups contained in one molecule of the acid derivative (B) are preferably the same.

Examples of the acid derivative (B) include triallyl cyanurate, triallyl thiocyanurate, trimethallyl thiocyanurate, 2-hydroxyethyl cyanurate tris(acrylate), 2-hydroxyethyl cyanurate tris(methacrylate), 2-hydroxyethyl cyanurate tris (allyl carbonate), 2-hydroxyethyl cyanurate tris(methallyl carbonate), triallyl isocyanurate, triallyl isothiocyanurate, trimethallyl isothiocyanurate, 2-hydroxyethyl isocyanurate tris(acrylate), 2-hydroxyethyl isocyanurate tris (methacrylate), 2-hydroxyethyl isocyanurate tris(allyl carbonate) and 2-hydroxyethyl isocyanurate tris(methallyl carbonate). These may be used alone or in combination of thereof.

A compound containing allyl groups as all of the unsaturated functional groups is preferable, and triallyl cyanurate and triallyl isocyanurate are further preferable.

The aliphatic group-containing compound (3) contains at least 3, preferably at least 4, more preferably from 4 to 8 unsaturated functional groups in a molecule. In the aliphatic group-containing compound (B), the unsaturated functional group is bonded directly or indirectly through an intermediate group (e.g. a hetero atom such as oxygen, nitrogen and sulfur) to an aliphatic skeleton. The aliphatic skeleton may contain a hetero atom such as oxygen, nitrogen and sulfur in addition to the carbon atom and the hydrogen atom.

In the aliphatic group-containing compound (B), the unsaturated functional group is particularly preferable to be a (meth)acrylic group. The (meth)acrylic group may be in form of an acryloyl group and/or a methacryloyl group.

The aliphatic group-containing compound may be an ester between a polyol and (meth)acrylic acid. The polyol may be a trihydric or higher alcohol. Examples of the polyol include a trihydric alcohol (e.g. glycerol and trimethylolpropane), a tetrahydric alcohol (e.g. pentaerythritol) and a hexahydric alcohol (e.g. dipentaerythritol).

Examples of the aliphatic group-containing compound (B) include tri(meth)acrylates such as trimethylolpropane tri(meth)acrylate and pentaerythritol trimethacrylate; tetra (meth)acrylates such as pentaerythritol tetra(meth)acrylate and dipentaerythritol tetra(meth)acrylate; penta(meth) acrylates such as penta(meth)acrylate of bis(2,2,2-trimethylolethyl) ether; and hexa(meth)acrylates such as dipentaerythritol hexa(meth)acrylate and hexa(meth) acrylate of bis(2,2,2-trimethylolethyl) ether. An ester having the pentaerythritol skeleton and (meth)acrylic acid group is preferable. Dipentaerythritol tetra(meth)acrylate and dipentaerythritol hexa(meth)acrylate are particularly preferable. These may be used alone or in combination thereof.

The addition amount of the component (B) is preferably from 5 to 30% by weight, more preferably from 10 to 25% by weight based on the total amount of the components (A) to (D).

Divinylbenzene (C) used in the present invention is p-divinylbenzene, m-divinylbenzene and a mixture of both. It may contain ethylvinylbenzene.

The addition amount of divinylbenzene (C) is preferably from 30 to 60% by weight, more preferably from 30 to 50% by weight, most preferably from 35 to 46% by weight based on the total amount of the components (A) to (D).

The polythiol compound (D) used in the present invention has preferably from 2 to 6 (especially from 2 to 4), more preferably at least 3 mercapto groups.

The examples of the polythiol compound (D) are as follows:

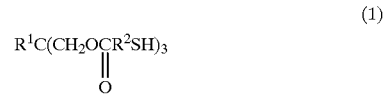

(1)

(2)

wherein $R^1$ denotes $CH_3$ or $CH_3CH_2$; and each $R^2$ denotes $CH_2$ or $CH_2CH_2$.

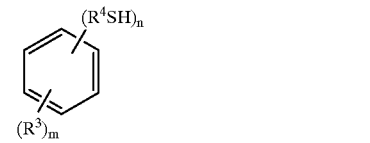

(3)

wherein each $R^3$ denotes H or $CH_3$; each $R^4$ denotes $CH_2$ or $CH_2CH_2$; and m and n are integers satisfying m+n=6 and n≧2.

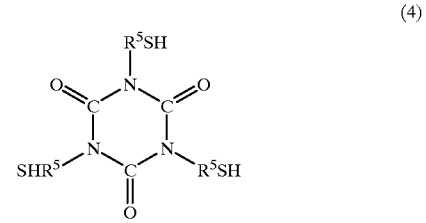

(4)

wherein each $R^5$ denotes an alkylene group having 1 to 6 carbon atoms.

Examples of the polythiol compound (D) include trimethylolpropane thioglycolate, trimethylolpropane thiopropionate, trimethylolpropane tristhioglycolate, trimethylolpropane tristhiopropionate, pentaerythritol tetrakisthioglycolate, pentaerythritol tetrakisthiopropionate, 1,2,4-tris(mercaptomethyl)benzene, 1,3,5-tris (mercaptomethyl)benzene, 2,4,6-tris(mercaptomethyl) mesitylene, 1,2,4,5-tetrakis(mercaptomethyl)benzene, tris (2-mercaptomethyl) isocyanurate and tris(3-mercaptopropyl) isocyanurate. These may be used alone or in combination thereof. Pentaerythritol tetrakisthioglycolate is preferable.

The addition amount of the polythiol compound (D) is preferably from 10 to 50% by weight, more preferably from 20 to 45% by weight based on the total amount of the components (A) to (D).

Together with the polythiol compound (D), in order to obtain an especially higher refractive index as well as the purposed optical properties and mechanical properties, a thiol compound having a sulfur content of at least 50% by weight in the molecule and having at least two functionalities may be used. Examples of such thiol compound include 1,2-dimercaptoethane, 1,2,3-trimercaptopropane, dimercaptoethyl sulfide, bis(2-mercaptoethyl) sulfide, 1,2-bis (mercaptoethyl)trithioglycerin, 2,5-bis(mercaptomethyl)-1, 4-dithiane, 2,6-bis(mercaptomethyl)-1,4-oxothiane and 2,5-bis(mercaptomethyl)thiophene.

Although the respective amounts of the components (A) to (D) used in the present invention are preferably within the foregoing ranges, the preferable use ratio of them is controlled such that the ratio of the functional group equivalent amounts, that is, (the number of unsaturated functional groups)/(the number of the mercapto groups) is from 1/1 to 5/1, more preferably from 1/1 to 4/1, particularly preferably from 1.5/1 to 4/1.

The viscosity of the curable composition of the present invention is preferably from 30 to 300 mPa·s at 30° C., more preferably from 50 to 200 mPa·s. In order to adjust the viscosity, a (meth)acrylic acid ester having less than three functionalities (for example, bifunctional) (e.g. a di(meth) acrylate ester) may be added as a viscosity adjustment agent (E).

An alcohol component for deriving the (meth)acrylic acid ester may be a compound wherein at least one OH group is bonded to a hydrocarbon group optionally containing oxygen atom (for example, diol). Examples of the alcohol component (having e.g. from 1 to 30 carbon atoms, especially from 4 to 20 carbon atoms) include alcohols (e.g. triethylene glycol and polyethylene glycol) containing an oxyalkylene group (e.g. an oxyethylene group) and alcohols (e.g. tricyclodecanedimethanol) of alicyclic hydrocarbons (e.g. tricyclic cycloaliphathic hydrocarbons).

Specific examples of the (meth)acrylic acid ester include triethylene glycol dimethacrylate, polyethylene glycol dimethacrylate and tricyclodecanedimethanol diacrylate.

The addition amount of the viscosity adjustment agent (E) is preferably from 0 to 30 parts by weight, more preferably from 0.5 to 25 parts by weight, particularly-preferably from 5 to 20 parts by weight based on 100 parts by weight of the total amount of the components (A) to (D).

A polymerization retarder may be added depending on necessity in order to keep a proper viscosity through the work process. Accordingly, the workability and the finishing of lenses can be improved.

The curable composition may contain (F) a polymerization retarder.

Examples of the polymerization retarder (F) include mercaptans, halogenated hydrocarbons and phenyl-containing monoolefins.

The mercaptans may be a compound having one mercapto group. Examples of the mercaptans include t-dodecanethiol, 1-dodecanethiol, 1-octanethiol and 2-mercaptoethanol.

The halogenated hydrocarbons may be a hydrocarbon substituted by at least one halogen atom (e.g. chlorine, bromine and iodine). Examples of the halogenated hydrocarbons include tetrachloromethane and ethylene bromide.

The phenyl group-containing monoolefins may be a monoolefin having at least one phenyl group.

The phenyl group-containing monoolefins may be those of the general formula (i), (ii) or (iii):

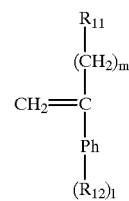
(i)

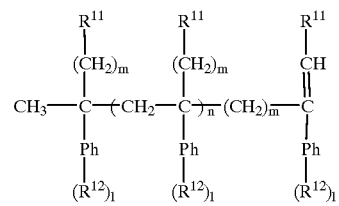
(ii)

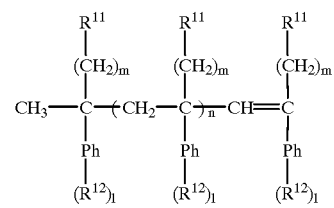
(iii)

wherein $R^{11}$ denotes a hydrogen atom or an alkyl group; $R^{12}$ denotes a hydrogen atom, an alkyl group, an alkoxyl group, an amino group, a nitro group, a carboxyl group or an ester group; Ph denotes a phenylene group; m is 0 or 1; n is an integer of from 0 to 3; and 1 is an integer of from 0 to 5.

Examples of the phenyl group-containing monoolefin (i) include 2-phenyl-1-propene(α-methylstyrene) and 2-phenyl-1-butene.

Examples of the phenyl group-containing monoolefin (ii) include 2,4-diphenyl-4-methyl-1-pentene, 3,5-diphenyl-5-methyl-2-heptene, 2,4,6-triphenyl-4,6-dimethyl-1-heptene and 3,5,7-triphenyl-5-ethyl-7-methyl-2-nonene.

Examples of the phenyl group-containing monoolefin (iii) include 1,3-diphenyl-1-butene, 2,4-diphenyl-4-methyl-2-pentene and 3,5-diphenyl-5-methyl-3-heptene. 2,4-Diphenyl-4-methyl-1-pentene is preferable.

The addition amount of the polymerization retarder (F) is preferably from 0 to 30 parts by weight, more preferably from 0.1 to 20 parts by weight, particularly preferably from 1 to 10 parts by weight based on 100 parts by weight of the total of the components (A) to (D).

Well-known antioxidant, ultraviolet ray absorbent, external or internal mold release agent, and the like may be added in the practical applications. A masking agent such as terpene may be added in order to suppress malodor caused by the compound having the mercapto group.

The curable composition of the present invention may be cured by heat, ultraviolet radiation, X ray and/or an ionizing radiation such as an electron beam to obtain a light-transmitting part such as a plastic lens from the curable composition. Heat and ultraviolet radiation are preferable. In order to obtain a rigid cured product, a radical polymerization initiator may be used.

Examples of the radical polymerization initiator (for example, a peroxide and an azo compound) employed in the present invention include benzoyl peroxide, tert-butyl peroxy-2-ethylhexanoate, tert-butyl peroxypivalate, diisopropyl peroxydicarbonate, 2,2'-azobis(2,4-dimethylvaleronitrile), 2,2'-azobisisobutyronitrile, 1,1'- azobis(1-acetoxy-1-phenylethane) and dimethyl[2,2'-azobis(isobutylate)]. These may be used alone or in combination thereof at the time of use. The radical polymerization initiator is preferably the azo compound.

The addition amount of the radical polymerization initiator may be from 0 to 5 parts by weight, for example from 0.1 to 4 parts by weight based on 100 parts by weight of the curable composition.

The plastic lenses can be prepared as follows: The aromatic diallyl compound (A), the unsaturated functional group-containing the compound (B), divinylbenzene (C) and the polythiol compound (D), and if necessary, the viscosity adjustment agent (E), the polymerization retarder (F), the polymerization initiator and the additive are mixed and stirred, and then the resultant mixture is defoamed. Next, the resultant composition is cast in a mold having a cavity and a gasket by the pressure of nitrogen gas or air. The polymerization is carried out at 20–120° C. for 1 to 48 hours and the polymerized product is demolded to give a lens. The resultant lens is cut at the outer circumference or subjected to a finishing process for washing out dirt to give a finished lens.

Although the production process of a plastic lens from the curable composition of the present invention will be described below, it is not at all restrictive.

Stirring may be carried out by shaking using a shaker. The stirring time differs depending on the raw materials and in case of a system containing diallyl isophthalate, triallyl isocyanurate or dipentaerythritol hexaacrylate, divinylbenzene, pentaerythritol tetrakisthioglycolate, 2,4-diphenyl-4-methylpentene and 2,2'-azobisisobutyronitrile, it is from 5 to 60 minutes (for example, about 15 minutes) in order to sufficiently dissolve 2,2'-azobisisobutyronitrile which is solid.

Defoaming is usually carried out to expel the dissolved air by periodically shaking the composition in decreased pressure. When the defoaming is insufficient, a large number of fine foams are sometimes formed in a molded product, resulting in the product fault. In the case of 500 ml of a cubic body of the above-described system, the defoaming is carried out for 5 to 60 minutes (for example, about 15 minutes). The mold to cast the composition is constituted by arranging glass molds having different curvatures in parallel to each other and supporting them with a ring-shaped gasket made of a proper resin. The ring has a proper part capable of pouring the composition so that the composition can be cast by using an injector equipped with an injection needle.

The polymerization is carried out by gradually increasing the temperature from a normal temperature to at highest approximately 120° C. With taking the half-life of the polymerization initiator into consideration, the increase rate of the temperature is preferably increased with the lapse of time of polymerization. In the demolding process, after the completion of polymerization, the glass cavity and the gasket cooled to about 60° C. are disassembled to demold the product. In the finishing process, the outer circumference of the product lens is ground to adjust the size and the polluting matter on the surface is removed.

PREFERRED EMBODIMENTS OF INVENTION

Hereinafter, the present invention will more particularly be illustrated with reference to Examples and Comparative Examples. In the following Examples, the compositions (parts) are by weight, unless specified.

Measurements in Examples are carried out as follows.

Colorless Transparency

The coloring degree and the like of a cured resin obtained by the cast polymerization were evaluated by visual observation.

○: colorless and transparent
Δ: slightly yellowish
×: yellow

Refractive Index and Abbe Number

Using an Abbe refractive index meter (manufactured by Atago Co. Ltd.) and α-bromonaphthalene as an intermediate liquid, the refractive index and the Abbe number were measured.

Thermal Distortion Temperature

According to JIS K-7207, the thermal distortion temperature was measured using a heat distortion tester S3-FH manufactured by Toyo Seiki Seisaku-sho, Ltd.

In the examples, the abbreviations have following meanings.

DAIP: diallyl isophthalate
TAIC: triallyl isocyanurate
DPHA: dipentaerythritol hexaacrylate
DVB: divinylbenzene
PETG: pentaerythritol tetrakisthioglycolate
PETP: pentaerythritol tetrakisthiopropionate
AMSD: 2,4-diphenyl-4-methyl-1-pentene
AAPE: 1,1'-azobis(1-acetoxy-1-phenylethane)
ADVN: 2,2'-azobis(2,4-dimethylvaleronitrile)
MAIB: dimethyl-2,2'-azobisisobutylate

EXAMPLE 1

A mixture of 2.5 parts of diallyl isophthalate, 10.0 parts of triallyl isocyanurate, 45.9 parts of divinylbenzene, 41.6 parts of pentaerythritol tetrakisthioglycolate, and 1.5 parts of 1,1'-azobis(1-acetoxy-1-phenylethane) was cast in a mold having two glass plates, put in a thermostat bath and gradually heated from 40° C. to 120° C. for 20 hours. After being demolded from the mold, the resultant curable resin was heated further at 120° C. for 1 hour to carry out the post-polymerization.

The resultant cured resin was colorless and transparent and had a refractive index of 1.60, an Abbe number of 35, and a thermal distortion temperature of 63° C.

EXAMPLES 2 to 4

The mixtures having the ingredients shown in Table 1 were subjected to the cast polymerization in the same manner as in Example 1 and the physical properties of the cured resins were measured. The results were shown in Table 2.

COMPARATIVE EXAMPLES 1 to 4

Although the ingredients shown in Table 3 were mixed, a homogeneous transparent solution could not be obtained. The phase separation was observed, even if the composition was cured. Since the resultant material was not homogeneous as a whole, the resultant material could not be subjected to the physical property measurement.

COMPARATIVE EXAMPLE 5

A mixture having the ingredients shown in Table 3 was subjected to cast polymerization in the same manner as in Example 1, the physical properties of the resultant cured resin were measured.

The cured resin was slight yellowish and had an enough refractive index of 1.60, but has a low Abbe number of 33 and a low thermal distortion temperature of 45° C.

TABLE 1

|  |  | Example 1 | Example 2 | Example 3 | Example 4 |
|---|---|---|---|---|---|
| Aromatic diallyl compound | DAIP | 2.5 | 3.0 | 3.3 | 2.8 |
| Acid derivative | TAIC | 10.0 |  |  |  |
| Aliphatic group-containing compound | DPHA |  | 19.8 | 22.0 | 18.9 |
| Divinylbenzene | DVB | 45.9 | 39.6 | 44.0 | 37.7 |
| Polythiol compound | PETG | 41.6 | 34.7 | 27.5 | 37.7 |
| Polymerization retarder | AMSD |  | 3.0 | 3.3 | 2.8 |
| Polymerization initiator | AAPE | 1.5 |  |  |  |
|  | ADVN |  | 0.4 | 0.4 |  |
|  | MAIB |  |  |  | 0.3 |

TABLE 2

|  | Example 1 | Example 2 | Example 3 | Example 4 | Com. Ex. 5 |
|---|---|---|---|---|---|
| Refractive Index | 1.60 | 1.59 | 1.59 | 1.59 | 1.60 |
| Abbe number | 35 | 35 | 35 | 37 | 33 |
| Colorless transparency | ○ | ○ | ○ | ○ | Δ |
| Thermal deformation temperature | 63 | 68 | 83 | 65 | 45 |

TABLE 3

|  |  | Com. Ex. 1 | Com. Ex. 2 | Com. Ex. 3 | Com. Ex. 4 | Com. Ex. 5 |
|---|---|---|---|---|---|---|
| Aromatic diallyl compound | DAIP |  |  |  | 9.0 |  |
| Acid derivative | TAIC |  | 9.0 |  |  |  |
| Aliphatic group-containing compuond | DPHA |  |  | 7.0 |  |  |
| Divinylbenzene | DVB | 49.5 | 45.0 | 45.0 | 34.0 | 70.0 |
| Polythiol compound | PETG | 49.5 | 45.0 | 45.0 | 58.0 |  |
|  | PETP |  |  |  |  | 30.0 |
| Polymerization retarder | AMSD | 1.0 | 1.0 | 1.0 | 1.0 |  |
| Polymerization initiator | AAPE |  |  |  |  |  |
|  | ADVN |  |  |  |  |  |
|  | MAIB | 0.4 | 0.4 | 0.4 | 0.4 | 0.4 |

EFFECTS OF THE INVENTION

The curable composition of the present invention can be produced at a normal temperature and the mixture liquid (that is, the curable composition) has a low viscosity maintained for at least 12 hours and is thus excellent in workability. The optical material obtained by curing the curable composition has a high refractive index of at least 1.58 and a high Abbe number and is excellent in optical transparency, solvent resistance, impact resistance and light resistance. The cured material can be easily subjected to processing such as hard coating, dying and grinding, so that the curable composition is usable for application to eye glass lenses, camera lenses and optical appliances. The curable composition can be also used for a colored filter, an adhesive and a coating agent.

What is claimed is:

1. A curable resin composition comprising:

(A) from 1 to 10% by weight of at least one aromatic diallyl compound;

(B) from 5 to 30% by weight of at least one unsaturated functional-group containing compound selected from the group consisting of an acid derivative obtained by replacing all of hydrogen atoms existing in the compounds selected from cyanuric acid, isocyanuric acid, and those obtained by substituting all of oxygen atoms existing in cyanuric acid and isocyanuric acid by sulfur atoms, with an organic group represented by the formula (I):

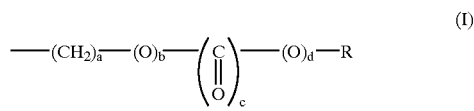

wherein a denotes an integer of from 0 to 2; b denotes 0 or 1; c denotes 0 or 1; d denotes 0 or 1; and R denotes an unsaturated functional group, and an aliphatic group-containing compound having an aliphatic skeleton bonded to at least three unsaturated functional groups;

(C) from 30 to 60% by weight of divinylbenzene; and (D) from 10 to 50% by weight of at least one polythiol compound having at least two mercapto groups in one molecule.

2. The curable resin composition according to claim 1, wherein the aromatic diallyl compound (A) is at least one compound selected from the group consisting of diallyl orthophthalate, diallyl isophthalate and diallyl terephthalate.

3. The curable resin composition according to claim 1, wherein the aromatic diallyl compound (A) is diallyl isophthalate.

4. The curable resin composition according to claim 1, wherein the unsaturated functional group R in the acid derivative (B) is at least one functional group selected from the group consisting of an allyl group, a methallyl group, an acryloyl group and a methacryloyl group.

5. The curable resin composition according to claim 1, wherein the unsaturated functional group R in the acid derivative (B) is an allyl group.

6. The curable resin composition according to claim 1, wherein the acid derivative (B) is triallyl cyanurate or triallyl isocyanurate.

7. The curable resin composition according to claim 1, wherein the unsaturated functional group in the aliphatic group-containing compound (B) is a (meth)acryl group.

8. The curable resin composition according to claim 1, wherein the aliphatic group-containing compound (B) is at least one compound having at least one pentaerythritol skeleton in one molecule.

9. The curable resin composition according to claim 1, wherein the aliphatic group-containing compound (B) is at least one compound derived from dipentaerythritol.

10. The curable resin composition according to claim 1, wherein the aliphatic group-containing compound (B) is dipentaerythritol tetra(meth)acrylate or dipentaerythritol hexa(meth)acrylate.

11. The curable resin composition according to claim 1, wherein the polythiol compound (D) is at least one compound selected from the general formula (1), (2), (3) or (4):

$$R^1C(CH_2OCR^2SH)_3 \quad (1)$$
$$\parallel$$
$$O$$

$$C(CH_2OCR^2SH)_4 \quad (2)$$
$$\parallel$$
$$O$$

wherein $R^1$ denotes $CH_3$ or $CH_3CH_2$; and each $R^2$ denotes $CH_2$ or $CH_2CH_2$;

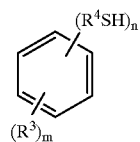 (3)

wherein each $R^3$ denotes H or $CH_3$; each $R^4$ denotes $CH_2$ or $CH_2CH_2$; and m and n are integers satisfying m+n=6 and n≧2; and

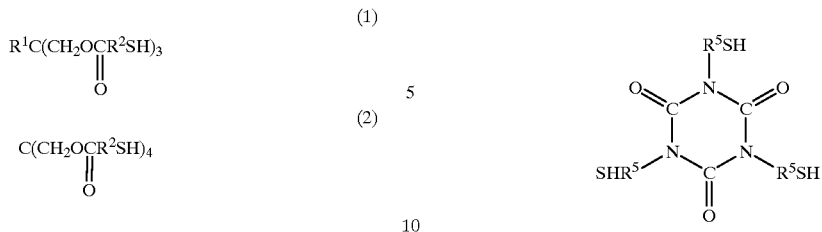 (4)

wherein each $R^5$ denotes an alkylene group having 1 to 6 carbon atoms.

12. The curable resin composition according to claim 1, which further contains (E) a viscosity adjustment agent which comprises a (meth)acrylic acid ester having less than three functionalities.

13. The curable resin composition according to claim 1, which further contains (F) a polymerization retarder.

14. The curable resin composition according to claim 13, wherein the polymerization retarder (F) is 2,4-diphenyl-4-methyl-1-pentene.

15. A plastic lens obtained by curing and forming into a lens the curable resin composition according to claim 1.

* * * * *